United States Patent [19]
Krusoe

[11] 4,133,410
[45] Jan. 9, 1979

[54] ANTI-THEFT DEVICE FOR VEHICLES

[76] Inventor: John A. Krusoe, 28852 Oak Grove Dr., Elkhart, Ind. 46514

[21] Appl. No.: 847,730

[22] Filed: Nov. 2, 1977

[51] Int. Cl.² .............................................. B60R 25/04
[52] U.S. Cl. ............................... 180/114; 307/10 AT; 123/198 B
[58] Field of Search .......................... 180/114, 103 BF; 123/198 DB, 198 B; 70/242, 243, 237; 307/10 AT, 10 R; 340/63, 64; 73/301, 304 R, 304 C

[56] References Cited
U.S. PATENT DOCUMENTS
3,907,060 9/1975 Burton et al. ........................ 180/114

Primary Examiner—Robert K. Schaefer
Assistant Examiner—Morris Ginsburg
Attorney, Agent, or Firm—Oltsch, Knoblock & Hall

[57] ABSTRACT

A vehicle anti-theft device which when activated by the vehicle user causes the fuel tank to be isolated from the internal combustion engine of the vehicle and simultaneously therewith causes the fuel gauge to register empty, thereby restricting movement of the vehicle upon unauthorized usage and creating the impression that no fuel is available for the vehicle.

2 Claims, 1 Drawing Figure

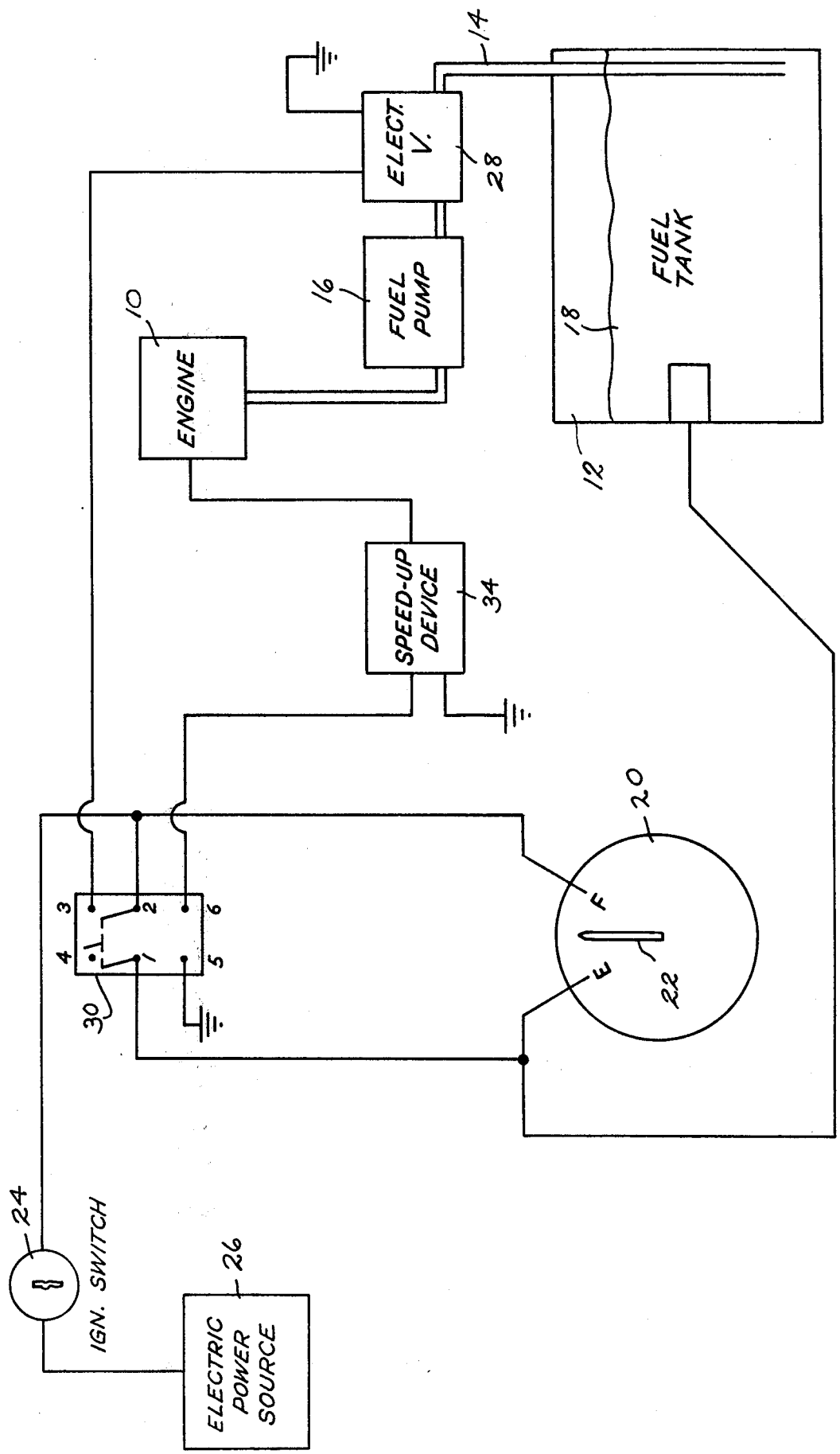

ANTI-THEFT DEVICE FOR VEHICLES

SUMMARY OF THE INVENTION

This invention relates to an anti-theft device for a vehicle and will have specific application to the isolation of the fuel tank from the vehicle combustion engine to prevent unauthorized use of the vehicle.

The anti-theft device of this invention includes a valve placed within the fuel line between the fuel tank and the combustion engine of the vehicle. The valve is electrically actuated and is connected by a switch member through the ignition switch to the power supply for the vehicle. The valve is normally located in its closed position, isolating the fuel tank from the vehicle engine. The switch member is also associated with the fuel gauge for the vehicle in such a manner so that when the switch member is located in its anti-theft position, the valve between the fuel tank and engine will remain in its closed position and the fuel gauge will indicate "empty" when the ignition switch is turned to start the vehicle engine. With the switch member in its anti-theft position the motor will start and then only continue to run until the fuel in that part of its fuel line which is isolated from the fuel tank is consumed.

With the fuel gauge indicating "empty," the unauthorized vehicle user is provided the impression that the vehicle is out of fuel. With the switch member located in its operative position, the valve in the fuel line between the fuel tank and engine opens when the ignition switch is turned on to allow for the normal operation of the engine as well as the normal indicating function of the fuel gauge.

Accordingly, it is an object of this invention to provide a device for preventing the unauthorized taking of motor vehicles.

Another object of this invention is to provide an antitheft device of simplified and reliable operation for installation in vehicles, such as automobiles and trucks.

Still another object of this invention is to provide an anti-theft device for motor vehicles having diesel or gasoline powered combustion engines.

Other objects of this invention will become apparent upon the reading of the invention's description.

BRIEF DESCRIPTION OF THE DRAWING

A preferred embodiment is chosen for the purposes of illustration and description wherein;

FIG. 1 is a diagrammatic view of the invention incorporated into the power system of a vehicle.

DESCRIPTION OF THE PREFERRED EMBODIMENT

The preferred embodiment illustrated is not intended to be exhaustive or to limit the invention to precise form disclosed. It is chosen and described in order to best explain the principles of the invention and its application and practical use to thereby enable others skilled in the art to best utilize the invention.

The power system of the motor vehicle shown diagrammatically in FIG. 1 includes a combustion engine 10, a fuel tank 12, a fuel line 14 extending from tank 12 to engine 10, and a suitable fuel pump or ejector mechanism 16 located within the fuel line for the purpose of withdrawing the fuel 18 from tank 12 and ejecting it into the cylinders of engine 10. The particular type of fuel 18 utilized in engine 10 may be of any of the variety of types utilized for combustion engines.

Mounted within the vehicle is a fuel gauge 20 which through a suitable metering device 22 indicates the fuel availability within tank 12. Mounted also within the vehicle is an ignition switch 24 which, in turn, is connected to a suitable electrical power source 26, such as a battery, generator or combination battery and generator. The aforedescribed power system for the motor vehicle is of standard form and construction with it being understood that a coil, starter and other suitable items pertinent to the particular type of engine utilized in the power system will be necessary to operationally complete the entire system but are not here illustrated for simplification purposes.

The anti-theft device of this invention includes a valve 28 placed within fuel line 14. Valve 28 is electrically actuated and has a normal "off" position when not energized to isolate fuel tank 12 from engine 10. A switch member 30 is mounted within the vehicle in an accessible but preferably hidden location. Valve 28 is electrically connected to power source 26 through switch member 30 and ignition switch 24. When switch member 30 is located in its operative position (connecting terminals 2 and 3, 1 and 4), valve 28 is electrically connected to ignition switch 24 which when turned on serves to energize the valve, causing it to open to place fuel tank 12 in fluid communication with engine 10.

Switch member 30 is also connected to fuel gauge 20 in such a manner so that when the switch is located in its antitheft position (connecting terminals 2 and 6, 1 and 5), the fuel gauge will be rendered inoperable upon activation of ignition switch 24 and its indicator 22 will register "empty" with valve 28 being de-energized so as to isolate fuel tank 12 from engine 10. The particular manner in which fuel gauge 20 is deactivated will vary depending upon the construction and manner of operation of the gauge. Typically, such gauges are coil actuated and are responsive to variations in resistance or current created by variations in the level of fuel within the fuel tank. In which case it will only be necessary to cause a grounding of the actuating current in the gauge when switch member 30 is shifted into its anti-theft position.

The manner of operation in the anti-theft device above described varies with the positioning of switch member 30. When the switch member 30 is in its operative position, the actuation of ignition switch 24 causes valve 28 to open permitting, during starting and continued normal operation of the vehicle, fuel 18 to be drawn from tank 12 and delivered to engine 10. Thus, with switch member 20 in its operative position, the power system for the vehicle will operate in its normal intended manner. When it is desired to secure the vehicle against theft or unauthorized usage, the user of the vehicle will shift switch member 30 into its antitheft position to deactivate fuel gauge 20 and cause valve 28 which is in its unenergized, closed position to be isolated from ignition switch 24 and power source 26. When ignition switch 24 is turned by an intruder to start the vehicle, the fuel gauge will register empty. As engine 10 is started, only that portion of the fuel between valve 28 and the engine will be fed to the engine thereby limiting the engine running time and thus preventing the vehicle from being driven an appreciable distance. Should the intruder attempt to bypass the ignition switch in order to start the vehicle, the anti-theft device of this invention would similarly operate as long as the intruder was not able to locate and actuate switch member 30.

Switch member 30 can also be electrically connected to a speed-up device or accelerator member 34 which is associated with the throttle of engine 10. Accelerator mechanism 34 is activated when switch member 30 is in its anti-theft position and ignition switch 24 is turned to start engine 10 and serves to cause the engine to run at a fast idle for the purpose of quickly consuming the fuel in fuel line 14 between closed valve 28 and the engine. The use of accelerator mechanism 34 can either prevent or substantially reduce the distance the intruder would be able to drive the vehicle before the limited fuel supply to the engine is exhausted. This can be accomplished by bypassing the cruise control governor with an electrically actuated valve which when actuated with switch member 30 in its anti-theft position and engine 10 started will cause a vacuum to be drawn upon the cruise control diaphragm which opens the accelerator of the vehicle.

It is to be understood that the invention is not to be limited to the details given but may be modified within the scope of the appended claims.

What I claim is:

1. An anti-theft device in combination with a motor vehicle having a combustion engine, a tank containing fuel for said engine, a fuel line connecting said engine to said tank, means for drawing fuel from said tank and delivering the fuel to said engine to cause the operation of the engine, a fuel gauge associated with said tank for indicating the amount of fuel therein, an electrical power source, said power source connected by an ignition switch to said fuel gauge, said fuel gauge having an indicator means shiftable between full and empty positions for indicating the amount of fuel in said tank when said gauge is energized by said power source, said ignition switch having an on position causing said fuel gauge to be energized and an off position, said anti-theft device comprising a valve connected to said fuel line between said engine and fuel tank, said valve having a normal closed position isolating said tank from said engine, a switch member carried by said vehicle in a hidden location having first and second operative positions, said valve being operatively connected to said power source through said ignition switch and switch member, said valve being shifted into an open position when said ignition switch is shifted into its on position and said member is in its first position, said valve being in its closed position when either said ignition switch is shifted into its off position or said switch member is in its second position, and means associating said switch member with said fuel gauge for causing said indicator means of the fuel gauge to be located in its empty position when said switch member is in its second position whereby said fuel tank will be isolated from said engine and said fuel gauge will indicate empty regardless of the position of said ignition switch.

2. The anti-theft device of claim 1 and means associated with said engine for accelerating the operation thereof when said switch member is in its second position to utilize the fuel in said fuel line between said valve and engine.

* * * * *